Patented July 10, 1951

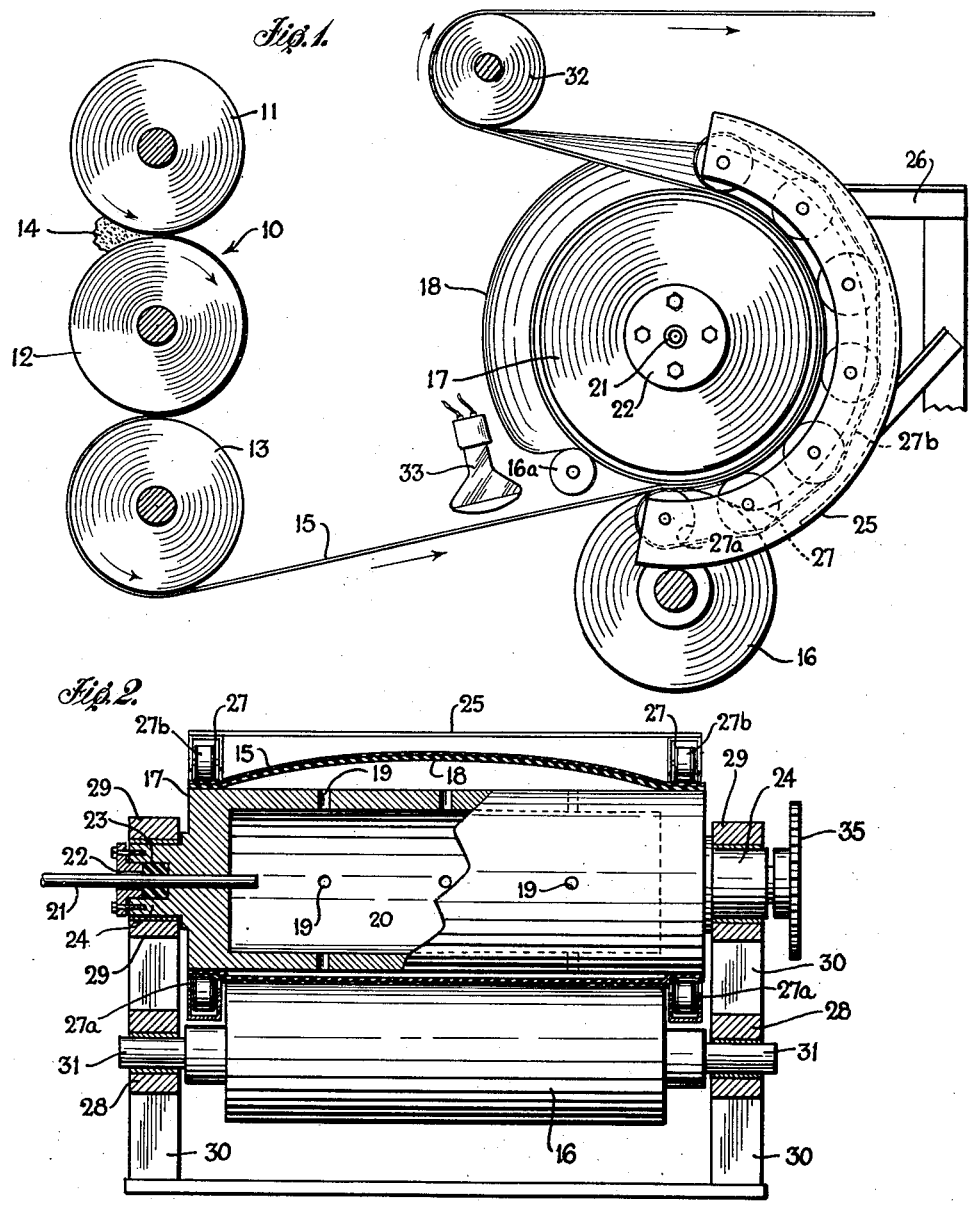

2,560,038

UNITED STATES PATENT OFFICE 2,560,038

PROCESS AND APPARATUS FOR CONTINUOUSLY STRETCHING PLASTIC SHEETS

James E. Trainer, Akron, Ohio, assignor to The Firestone Tire & Rubber Company, Akron, Ohio, a corporation of Ohio Application June 26, 1947, Serial No. 757,246

9 Claims. (Cl. 18—1)

1

This invention relates to processes and apparatus for continuously stretching a moving plastic film or sheet in a direction at right angles to the direction of movement of the sheet.

Heretofore various types of plastic materials have been produced in sheet form. These plastic sheets have many uses, among which is use as a packaging or covering material; as an artificial leather material for use in handbags, shoes, or pocketbooks; as bathroom curtain material; as a wall covering; and for a great variety of other uses. These plastic materials can be formed into sheets or films by any of a number of desired processes, with some plastic sheets being prepared by a calendering or rolling action, with other plastic materials being formed to sheets by a casting process, and still other plastic materials being formed into sheets by being extruded in tubular form and thereafter slit longitudinally and opened out into flat sheet form.

These various types of plastic sheets are thin, ordinarily extremely flexible and have high strength, being quite tear and abrasion resistant. In the manufacture of the sheets, the plastic materials ordinarily are often subjected to stretching forces which are at right angles to each other so that the plastic material is elongated or tensioned in two directions during its period of formation, or else after the sheet is formed to its original size. It has heretofore been determined that nearly all types of plastic sheets are given improved properties, both as to their flexibility and strength or tear resistance by stretching the sheet in two directions at right angles to each other during its formation. However, it is a difficult operation to stretch plastic sheets in directions at right angles to each other and to control the amount of stretch in each direction. The specific reasons for the improved properties in the plastic sheets after they have been given a "two-way" stretch are not definitely established but the desirability of such stretching action is readily substantiated by test.

A particular problem relates to the transverse stretching of a continuously moving sheet of plastic material. This invention is especially concerned with the lateral elongation of continuous plastic sheets and it usually is preferable to combine such a stretching action with that of elongating the sheet in its direction of movement. Various types of apparatus and methods have been used heretofore to effect a continuous "two-way" stretching action but the degree of stretch has been hard to control, the apparatus and method have required appreciable supervision, or they have been otherwise objectionable.

The general object of the present invention is to provide an improved, continuous process and apparatus for stretching a moving plastic sheet in a direction normal to its direction of movement, which method and apparatus is character-

2 ized by its uncomplicated, efficient, positive action which gives a controllable stretching action.

Another object of the invention is to provide a method for stretching a plastic sheet by use of an inflatable resilient sleeve.

Another object of the invention is to secure the moving lateral edges of a moving plastic sheet against lateral movement and to expand the plastic sheet between its edge portions.

A further object of the invention is to provide an inexpensive method, requiring a minimum of apparatus and labor, for stretching plastic sheets in two directions.

Another object of the invention is to provide a plastic sheet stretching method wherein the stretching pressure can be adjusted easily in accordance with the kind and size of sheet material being processed and the degree of stretch desired.

The foregoing and other objects and advantages of the invention will be made apparent as the specification proceeds.

Reference now is made to the accompanying drawings wherein:

Fig. 1 is a diagrammatic side elevation of apparatus embodying, and for practicing the principles of, the invention; and Fig. 2 is a front elevation, partly in section, of the stretching means of the invention.

Referring more in detail to the drawings, apparatus for forming continuous films or sheets of plastic material is shown, and in this instance comprises a calender 10, having a plurality of vertically aligned rolls 11, 12 and 13, with a mass of plastic material, in plastic condition, 14 being fed to the calender 10 between the upper two rolls thereof. The plastic 14 is rolled into sheet contour by the calender 10 and passes therethrough between the rolls 11 and 12 and the rolls 12 and 13, as shown, to be formed into a sheet 15. The heat developed in the calendering operation maintains the material forming the sheet 15 in plastic condition.

In order to obtain a substantially simultaneous two-way stretch of the sheet 15, it is led between a roll 16 and a special hollow roll 17 with the surface speed of the rolls 16 and 17 being greater by any desired amount than that of the roll 13. Hence the sheet 15 is given a longitudinal stretch as it passes from the roll 13 to the rolls 16 and 17. The roll 17 is provided with a resilient sleeve 18 made of any suitable rubber or rubber-like material telescoped over the roll 17 into encompassing relation therewith, with the ends of the rubber sleeve 18 being sealed, bonded, or secured to the periphery of the roll 17 in any desired manner, such as by vulcanization. The sleeve 18 in its normal, or unstressed condition tightly fits over the roll 17 and a plurality of ports 19 are provided in the wall of the roll 17, so that air or other fluid pressure medium may be introduced into an interior chamber 20 of the roll 17 and pass out of the ports 19 to inflate the sleeve 18. A pipe or tube 21 is secured to one end of the roll 17 in one of the shafts 24 thereof and connects to a suitable source (not shown) of air pressure whereby any desired pressure can be introduced into the roll 17. A suitable packing gland 22 and packing ring 23 serve to prevent leakage of pressure around the tube 21. A controllable pressure may, in this manner, be established within the roll 17 so that such pressure can be used to expand and retain the rubber sleeve 18 radially outwardly of the roll 17 at all parts of the sleeve except those pressed or retained against or adjacent the roll 17 as hereinafter explained. The center portion of the rubber sleeve is forced outwardly of the roll 17 the maximum extent, since the ends of the rubber sleeve are secured to the roll and the expanded rubber sleeve takes an arcuate position as shown in the upper portion of Fig. 2. Normally the rolls 16 and 17 are so adjusted and sufficient pressure is set up therebetween that the rubber sleeve 18 is compressed down to a position immediately adjacent, or against the surface of the roll 17, at the roll bight as indicated in the lower portion thereof, in Fig. 2.

In order to retain the edges of the sheet 15 in a given position and permit transversely directed stretch of the sheet, a semi-cylindrical yoke member 25 is provided on one side of the roll 17 and is positioned by a bracket 26. The yoke 25 extends the width of the rolls 16 and 17 and journals a plurality of rollers 27 therein adjacent each end of the roll 17. Rollers 27 bear against the margins of plastic sheet 15, and in turn upon the margins of sleeve 18 and the periphery of the roll 17 adjacent the ends thereof. One of such rollers 27a in each roller set is positioned on an extension of the bight, or axial line of contact between the rolls 16 and 17 whereby such rollers 27a will secure the edges of the sheet 15 to the roll 17 at the point of initial contact with the roll. A belt 27b may be trained around the series of rollers 27 and 27a in order to clamp the margins of plastic sheet 15 securely in the areas between rollers 27. As the rolls turn and the plastic sheet 15 moves beyond the "bight" of the rolls 16 and 17, the rubber sleeve 18 will be distended radially outwardly and cause transverse stretching of the sheet since the sheet is still secured against lateral movement by the rollers 27. It may be desirable to flatten the resilient sleeve 18 in an area in advance of its point of contact with the film. For this purpose a roll 16a or equivalent device may be mounted in housing 30 adjacent the bight of rolls 16 and 17 to force sleeve 18 into contact with the surface of roll 17. This will eliminate any tendency for the film to be distorted by sleeve 18 prior to passing through the bight of the rolls.

By variation of the composition of the rubber sleeve 18 initially provided and by varying the pressure set up therein, the degree of transverse stretch of the sheet 15 can be easily controlled to desired limits, dependent upon the size and material of the plastic sheet being processed. Likewise, the rolls 16 and 17 are driven by any conventional means so that the speed of such rolls can be adjusted to provide easy adjustment of the amount of longitudinal elongation of the sheet 15 produced, which could even be zero if desired, although the process and apparatus disclosed herein are normally used to effect a "two-way" stretch.

The rolls 16 and 17 are journalled in any conventional manner and are shown as being positioned by pairs of bearings 28 and 29 respectively, which engage with the shafts 24 on the roll 17 and with shafts 31 on the roll 16. The bearings 28 and 29 are mounted in housings 30. For convenience in showing rolls 16 and 17 in Fig. 1, the housings 30 and gear 35 are not shown therein.

The sheet 15 usually passes over a roll 32 after it has been stretched by the rolls 16 and 17 and may pass therefrom to a wind-up roll, if desired. It may be desirable to provide spreader means of a conventional type on the roll 32 to aid in flattening the sheet 15 without permitting it to contract. Such means may comprise a rib on roll 32 with the rib extending in oppositely directed spirals around the roll from the center thereof. Such a rib may even be in the form of a narrow brush, or a spreader as shown in U. S. Patent 1,642,496. It may be desirable to keep the film in a semi-plastic state during the stretching operation, for instance by heating or by retaining enough solvent in the film to render the same somewhat rubbery in consistency. A heating means, such as a bank of infra-red lamps, 33 may be positioned to direct heat radiations upon the film 15 at a point just in advance of the nip between the rolls 16 and 18. Before relaxing the tension, the film may be reconverted to its less plastic state, for instance by cooling or by removal of solvent.

From the foregoing, it will be seen than an inexpensive, uncomplicated method has been provided for giving plastic sheets a one-way or a two-way stretch. This stretching action is obtained by apparatus which once set up and adjusted for a given sheet, will function continuously and automatically with a minimum of control and maintenance.

The invention is adapted for use with any type of plastic sheet material, but is especially suited for processing relatively brittle sheets that require only a small degree of stretch to achieve appreciably more flexibility, such as sheets obtained by casting and drying a mixture of a vinyl resin and buna N synthetic rubber dissolved in a suitable solvent. Specifically, such a film may be prepared from about 100 parts of a suitable vinyl resin, such as one comprising a copolymer of approximately 90 parts of vinyl chloride and 10 parts vinylidene chloride, together with small amounts of plasticizer and other ingredients; zero to 50 parts of buna N rubber; and sufficient solvent such as methyl ethyl ketone to dissolve the two materials. The process also is well adapted, for example, for treatment of films made from rubber hydrochloride, chlorinated rubber, polyvinyl chloride, or polystyrene. Of course, the advantages flowing from the present invention are also achieved or result when any plastic sheet material is processed as set forth herein but the invention and its application and results are somewhat dependent upon the nature of the plastic sheet being processed. For more plastic sheets, it may be desirable to pass the material through a plurality of pairs of stretching rolls to achieve a greater percentage of stretching action. Plastics may have varying amounts and different types of plasticizers present therein and such ingredients appreciably vary the physical properties of the sheets formed therefrom. Sheets made in accordance with the invention have had improved tear resistance and have not had a longitudinally extending grain as is present in sheets made by previously known methods.

While one complete embodiment of the invention has been illustrated and described herein, the invention is not limited to the specific example set forth since modification may be resorted to within the scope of the appended claims.

What is claimed is:

1. Apparatus for stretching a plastic sheet in a transverse direction comprising a pair of rolls between which the sheet material is fed, a resilient sleeve substantially enclosing the peripheral surface of one of said rolls, means for inflating said resilient sleeve, said rolls being positioned in contacting relation to form a roll bight, an auxiliary roll for pressing said sleeve against its positioning roll in advance of the bight of said rolls, and means for clampingly engaging the margins of a plastic sheet and the margins of said covered roll at the point of contact of the sheet with said covered roll adjacent the roll bight, said last-named means being adapted to retain the edges of the sheet against said covered roll and permit transverse elongation of the sheet by an expanding action of said rubber sleeve as the sheet is retained in contact with said covered roll on further rotation thereof.

2. Apparatus for stretching a plastic sheet in a transverse direction comprising a pair of rolls defining a roll bight between which the sheet material passes, a rubber sleeve covering one of said rolls and inflatable with relation thereto, means for introducing fluid pressure into the roll having said sleeve thereon, means provided in said covered roll to transmit fluid pressure to the interior of said sleeve to effect expansion thereof, and a plurality of rollers for securing the edges of a plastic sheet to said covered roll at the first point of contact of said sheet with said covered roll, said rollers also being adapted to retain the edges of the sheet against the end portions of said covered roll and permit transverse elongation of the sheet by an expanding action of said rubber sleeve after passage of the sheet through the roll bight.

3. Apparatus for stretching a plastic sheet in a transverse direction comprising a pair of rolls defining a roll bight between which the sheet material passes, a rubber sleeve mounted in telescoped association with one of said rolls and secured thereto at the ends of the sleeve to cover such roll, means for introducing fluid pressure into the one of said rolls having said sleeve thereon, port means provided in the roll having said sleeve thereon to transmit fluid pressure to the interior of said covered roll to expand portions of said sleeve, said sleeve being retained contiguous to its mounting roll along the bight of said rolls, an auxiliary roll for pressing said sleeve against the said roll mounting it immediately in advance of the bight of said rolls, and a plurality of rollers for securing the edges of a plastic sheet to said covered roll at the roll bight and for a substantial circumferential distance therefrom, to permit transverse elongation of the sheet by expanding action of said rubber sleeve.

4. Apparatus for stretching an elongated plastic sheet in a transverse direction comprising a pair of parallel rolls forming a roll bight between which the sheet material passes, a rubber sleeve mounted in telescoped association with one of said rolls and secured adjacent its ends to the roll to cover same, means for introducing fluid pressure into said covered roll, port means provided in said covered roll to transmit fluid pressure to the bore of said sleeve so as to expand same normally, an auxiliary roll extending the length of said rolls in advance of the roll bight, said sleeve being compressed against its mounting roll by said auxiliary roll in advance of the roll bight, and means to constrain marginal portions of the sheet against transverse displacement as said sleeve forces the medial portion of the sheet progressively radially outwardly after the sheet passes through the bight of said rolls.

5. Apparatus for stretching a plastic sheet in a transverse direction comprising a pair of parallel rolls forming a roll bight between which the sheet material passes, a rubber sleeve covering one of said rolls and inflatable with relation thereto, means for introducing fluid under pressure into said sleeve and normally retaining it expanded from the roll which it covers, said sleeve being compressed to a position at least substantially against the roll which it covers by the other of said rolls, a plurality of rollers, a yoke journalling said rollers in a pair of spaced parallel arcs adapted to engage with a portion of the periphery of said covered roll adjacent the margins thereof to secure the edges of a plastic sheet thereto, said rollers being positoned so as to engage with the sheet at the first point of contact of the sheet with said covered roll and to constrain marginal portions of the sheet against contraction after passage through the roll bight, and means securing said yoke in a position to retain said rollers against said covered roll.

6. Apparatus as in claim 5 wherein the covered roll extends axially beyond each end of the other of said rolls, and the rollers are engaged with such end sections of said covered roll.

7. Apparatus as in claim 5 wherein an auxiliary roll is provided to flatten the rubber sleeve against the covered roll immediately in advance of the roll bight.

8. Apparatus for stretching a plastic sheet in a transverse direction comprising a pair of rolls between which the sheet material is introduced, an expansible sleeve covering the cylindrical surface of one of said rolls, means for inflating said sleeve, said rolls being positioned in contacting relation to form a roll bight, means for securing the edges of a plastic sheet against said covered roll at the roll bight, said last-named means being adapted to retain the edges of the sheet against said covered roll and permit transverse stretching of the sheet by an expanding action of said rubber sleeve as the sheet is retained in contact with said covered roll on further rotation thereof.

9. The method of treating elongate plastic sheet material consisting of continuously feeding said sheet material in the direction of its longitudinal axis, constraining the lateral marginal portions of the material against displacement, and subjecting the medial region thereof progressively to pneumatic distending pressure.

JAMES E. TRAINER.

REFERENCES CITED

The following references are of record in the file of this patent:

UNITED STATES PATENTS

| Number | Name | Date |
| --- | --- | --- |
| 1,971,667 | Weeks | Aug. 28, 1934 |
| 2,047,497 | Studt | July 14, 1936 |
| 2,067,025 | Schmidt | Jan. 5, 1937 |
| 2,176,925 | Reichel et al. | Oct. 24, 1939 |
| 2,325,204 | Kilborn | July 27, 1943 |
| 2,334,022 | Minich | Nov. 9, 1943 |